UNITED STATES PATENT OFFICE.

SAMUEL P. DUFFIELD, OF DETROIT, MICHIGAN.

IMPROVED MODE FOR THE PURIFICATION OF SALT-BRINES.

Specification forming part of Letters Patent No. 42,280, dated April 12, 1864.

*To all whom it may concern:*

Be it known that I, SAMUEL P. DUFFIELD, chemist, of Detroit, Wayne county, Michigan, have invented a new Mode, Method, or Process for the Purification of Salt-Brines from the Impurities of Iron, the Chlorides of Calcium, and Magnesium; and I do hereby declare that the following is a full and exact description or statement of such mode or process.

The nature of this mode, method, or process consists in so applying to salt-brines in their original condition, or to re-solutions of salt, for the purpose of precipitating iron and the chlorides of calcium and magnesium, and so of purifying such brines or re-solutions of salt from the impurities above named, ashes derived from wood treated in the following manner, viz:

Ashes derived from the combustion of the ordinary woods used for fuel are first placed in a reverberatory-furnace and flame passed over them for the space of three hours, so as to burn off the coloring-matter and the free charcoal in admixture, and to decompose the silicate of alumina in the same into the silicate of lime. The ashes are then withdrawn from the furnace and leached or boiled until the alkalies are extracted. The clear solution derived from this last process constitutes a medium, means, or compound by force of which, when applied by introducing the same into the salt-brines in their original state, or to any re-solution of salts, in the proportion of one equivalent to the anhydrous alkali in the solution to one equivalent of either of the foreign chlorides, the aforementioned chlorides of calcium and magnesium and the iron, if present in said brines, are in a short time duly precipitated, so as to leave a solution of salt free from all foreign chlorides, and this at the low rate of cost apparent from the material thus employed. Ashes alone would accomplish an imperfect purification of these brines; but it would be attended with the presence of more or less of their coloring-matter, of the alumina, and the soluble salts of iron, which would produce, necessarily, unsatisfactory results in the salt as manufactured.

What I claim, therefore, as my invention, and desire to secure by Letters Patent, is—

The application of ashes treated as above for the purification of salt-brines or re-solutions of salts, and a precipitation caused thereby of the chlorides of calcium and magnesium and of iron, the same, in order to secure success, being first treated in a reverberatory-furnace, as above described, and subsequently boiled or leached, so as to secure the clear solution thereof, which is then applied or introduced into the brines or re-solution of salts in the proportion and manner above described.

Detroit, February 23, 1864.

SAMUEL P. DUFFIELD.

Witnesses:
 DANIEL BREED,
 CHAS. E. UPPERMAN.